(12) United States Patent
Khalighi et al.

(10) Patent No.: US 10,822,042 B2
(45) Date of Patent: Nov. 3, 2020

(54) PLASMA ACTUATED DRAG REDUCTION

(71) Applicant: GM GLOBAL TECHNOLOGY OPERATIONS LLC, Detroit, MI (US)

(72) Inventors: Bahram Khalighi, Birmingham, MI (US); Gayatri V. Dadheech, Bloomfield Hills, MI (US); Taeyoung Han, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 178 days.

(21) Appl. No.: 16/212,896

(22) Filed: Dec. 7, 2018

(65) Prior Publication Data

US 2020/0180708 A1 Jun. 11, 2020

(51) Int. Cl.
*B62D 35/00* (2006.01)
*H05H 1/24* (2006.01)

(52) U.S. Cl.
CPC ........... *B62D 35/00* (2013.01); *H05H 1/2406* (2013.01); *H05H 2001/245* (2013.01); *H05H 2001/2425* (2013.01); *H05H 2001/2431* (2013.01); *H05H 2001/2456* (2013.01)

(58) Field of Classification Search
CPC ................ B62D 35/00; H05H 1/2406; H05H 2001/2456; H05H 2001/2425; H05H 2001/245; H05H 2001/2431
See application file for complete search history.

(56) References Cited

U.S. PATENT DOCUMENTS 9,821,862 B2 11/2017 Han et al.

*Primary Examiner* — D Glenn Dayoan
*Assistant Examiner* — Melissa Ann Bonifazi
(74) *Attorney, Agent, or Firm* — Quinn IP Law

(57) ABSTRACT

An apparatus configured to reduce drag is provided. The apparatus includes a plasma actuator including a hollow cylinder with two open bases, a first electrode disposed inside the cylinder, a second electrode disposed outside the cylinder, and a plasma layer disposed inside the cylinder next to the first electrode, a surface including the plasma actuator disposed on the surface, and a motion actuator configured to move the plasma actuator in a sweeping motion across a face of the surface.

20 Claims, 5 Drawing Sheets

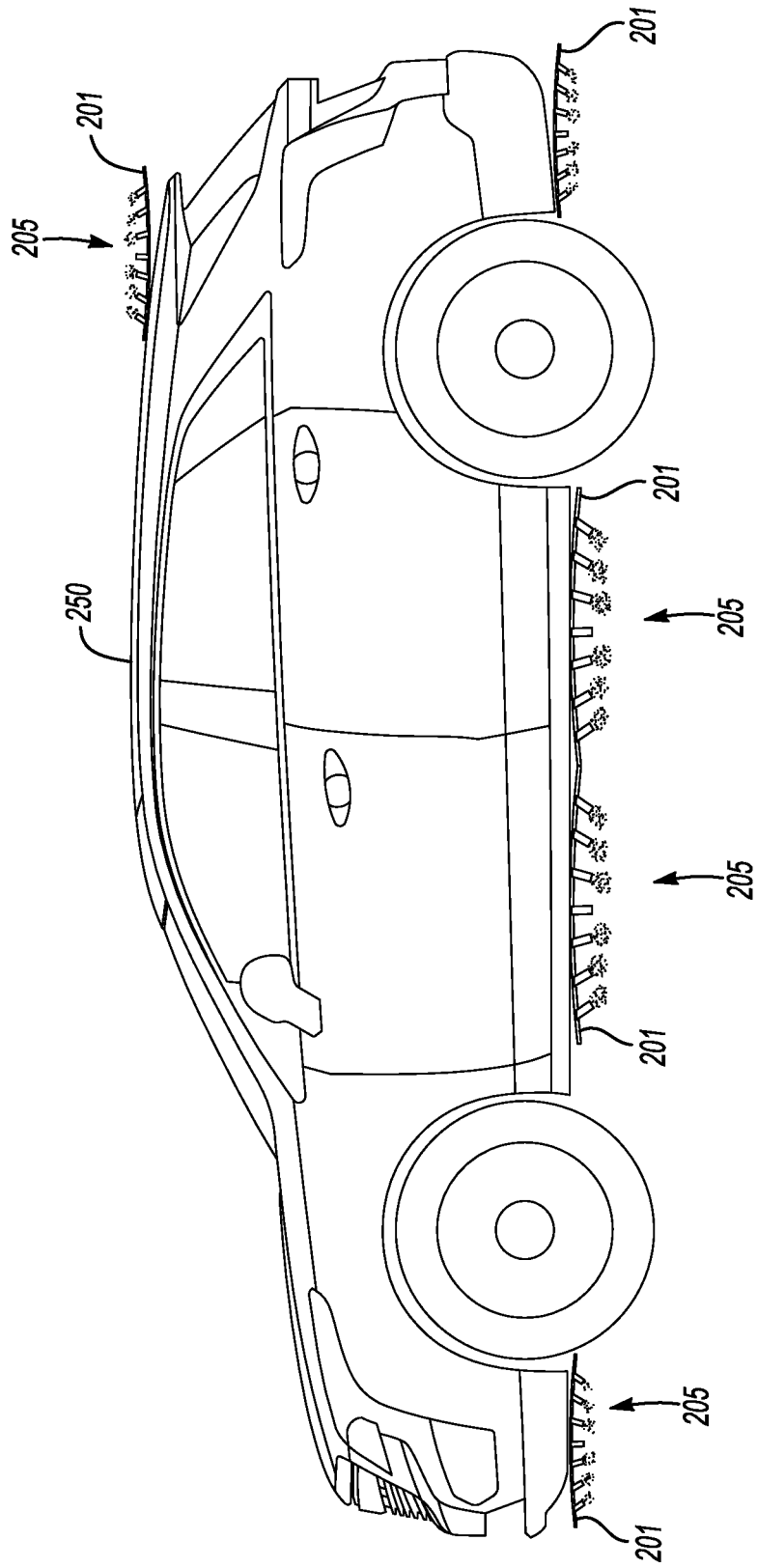

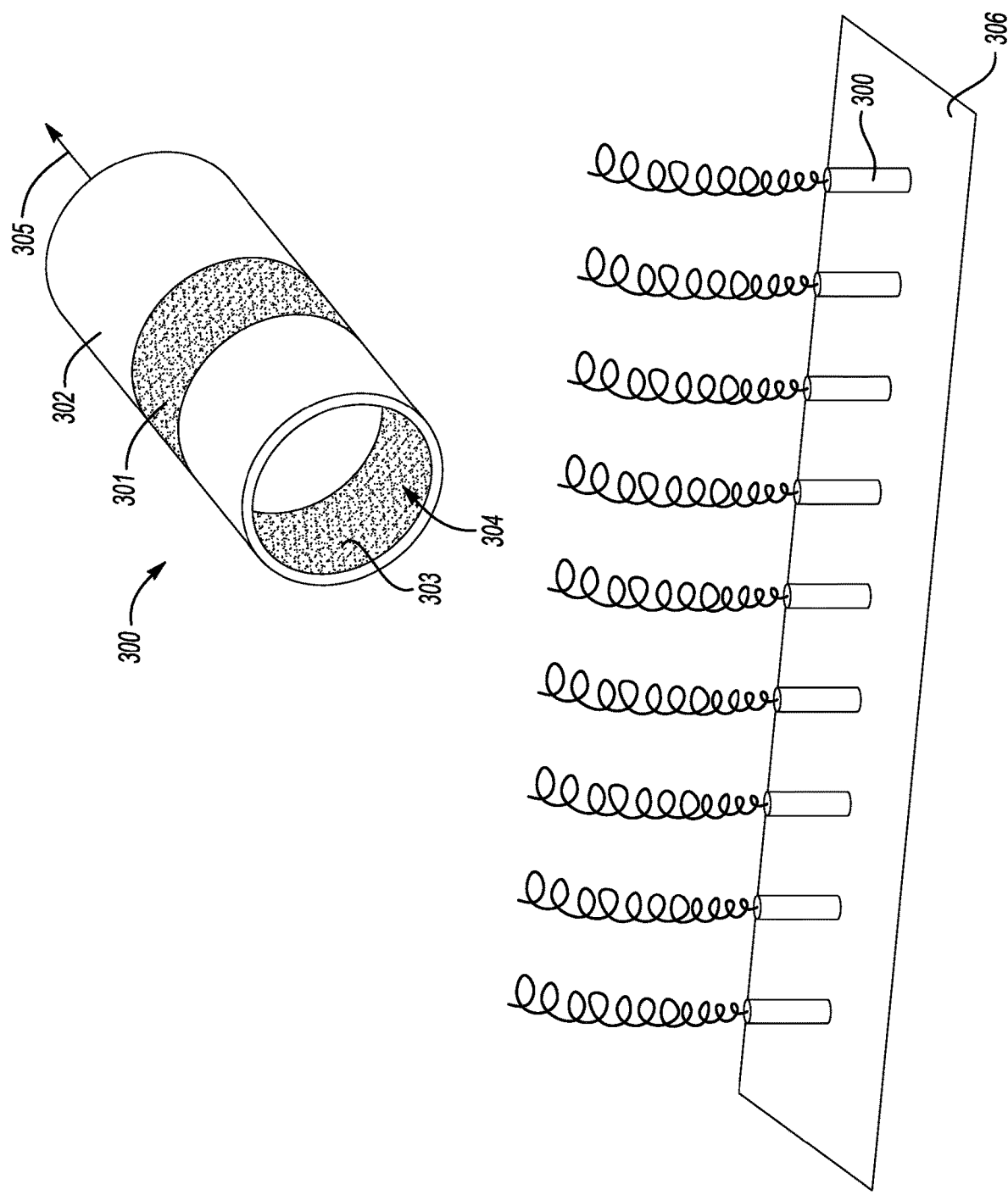

PLASMA ACTUATED DRAG REDUCTION

CROSS REFERENCE TO RELATED APPLICATIONS

The present application is related to U.S. Pat. No. 9,821,862 entitled Plasma Actuator for Vehicle Aerodynamic Drag Reduction, issued on Nov. 21, 2017, U.S. application Ser. No. 15/954,788 entitled Internal Flow Control Using Plasma Actuators, filed on Apr. 17, 2018, and U.S. application Ser. No. 15/970,221 entitled Systems and Apparatuses for High Performance Atmosphere by Piezoelectric Resonant Plasmas to Modulate Air Flows, filed on May 3, 2018.

INTRODUCTION

Apparatuses and methods consistent with exemplary embodiments relate to drag reduction. More particularly, apparatuses and methods consistent with exemplary embodiments relate to plasma actuators configured to reduce drag.

SUMMARY

One or more exemplary embodiments provide a drag reduction apparatus. More particularly, one or more exemplary embodiments provide an apparatus configured to reduce drag through the configuration of plasma actuators.

According to an aspect of an exemplary embodiment, an apparatus configured to reduce drag is provided. The apparatus includes a plasma actuator comprising a hollow cylinder with two open bases, a first electrode disposed inside the cylinder, a second electrode disposed outside the cylinder, and a plasma layer inside the cylinder next to the first electrode; a surface including at least one of the plasma actuator disposed on the surface; and a motion actuator configured to cause the at least one of the plasma actuator to move in a sweeping motion across the surface.

The surface may include one or more from among a top of a side view mirror of a vehicle, an A pillar of a vehicle, a bottom of an area under a front bumper of a vehicle, a bottom of an area between front and back wheels of a vehicle, wheel wells of a vehicle, a top of a trunk, a liftgate, a tailgate or a hatch of a vehicle, a bottom of an area under a rear bumper of a vehicle, and a vertical edge at a driver side or passenger side of a rear of a vehicle.

The at least one of the plasma actuator may include a plurality of plasma actuators.

The motion actuator may be configured to move the surface to cause the at least of the plasma actuator to sweep across the surface.

The motion actuator may be configured to move the plasma actuator to sweep across the surface. The motion actuator may include a piezoelectric device.

The apparatus may include a vehicle speed sensor configured to measure a speed of a vehicle, and the motion actuator may include a power controller configured to adjust a frequency and a voltage of power supplied to the piezoelectric device according to the speed of the vehicle measured by the speed sensor.

The apparatus may include a base pressure sensor configured to detect a base pressure of an area behind a vehicle, and the power controller may be configured to adjust the frequency and the voltage of power supplied to the piezoelectric device according to the speed of the vehicle and the base pressure measured by the base pressure sensor.

The power controller may be configured to adjust the frequency in range between 2 KHz and 20 KHz according to the speed of the vehicle and the base pressure.

The apparatus may include a base pressure sensor configured to detect a base pressure of an area behind a vehicle, and the power controller is configured to adjust a frequency and voltage of power supplied to the piezoelectric device according to the base pressure measured by the base pressure sensor.

The power controller may be configured to adjust the frequency in range between 2 KHz and 20 KHz according to the speed of the vehicle and the base pressure.

The power controller may be configured to output a voltage of up to 10 KV to the piezoelectric device.

The motion actuator may include a direct current (DC) to DC converter configured to covert power to an appropriate voltage and frequency to operate the piezoelectric device. The direct current (DC) to DC converter may include a signal generator and an amplifier.

The piezoelectric device may include a piezoelectric resonator configured to receive a signal processed by the signal generator and the amplifier.

The surface may be a curved surface.

The hollow cylinder may include an insulator.

According to an aspect of another exemplary embodiment, an apparatus configured to reduce drag is provided. The apparatus may include a plasma actuator, a surface comprising at least one of the plasma actuator disposed on the surface, and a motion actuator configured to cause the at least one of the plasma actuator to move in a sweeping motion across the surface.

The motion actuator may include a piezoelectric device, the apparatus may further include a vehicle speed sensor configured to measure a speed of a vehicle, and the motion actuator may include a power controller configured to adjust a frequency and a voltage of power supplied to the piezoelectric device according to the speed of the vehicle measured by the speed sensor.

The apparatus may include a base pressure sensor configured to detect a base pressure of an area behind a vehicle, and the power controller may be configured to adjust the frequency and the voltage of power supplied to the piezoelectric device according to the speed of the vehicle and the base pressure measured by the base pressure sensor.

Other objects, advantages and novel features of the exemplary embodiments will become more apparent from the following detailed description of exemplary embodiments and the accompanying drawings.

BRIEF DESCRIPTION OF THE DRAWINGS

The disclosed examples will hereinafter be described in conjunction with the following drawing figures, wherein like numerals denote like elements, and wherein:

FIGS. 2A and 2B show illustrations of various configurations of plasma actuators controlled by an apparatus configured to reduce drag according several aspects of exemplary embodiments;

FIG. 3 shows a plasma actuator of the apparatus configured to reduce drag and a configuration of several plasma actuators according to aspects of an exemplary embodiment.

DETAILED DESCRIPTION

Figure 1:
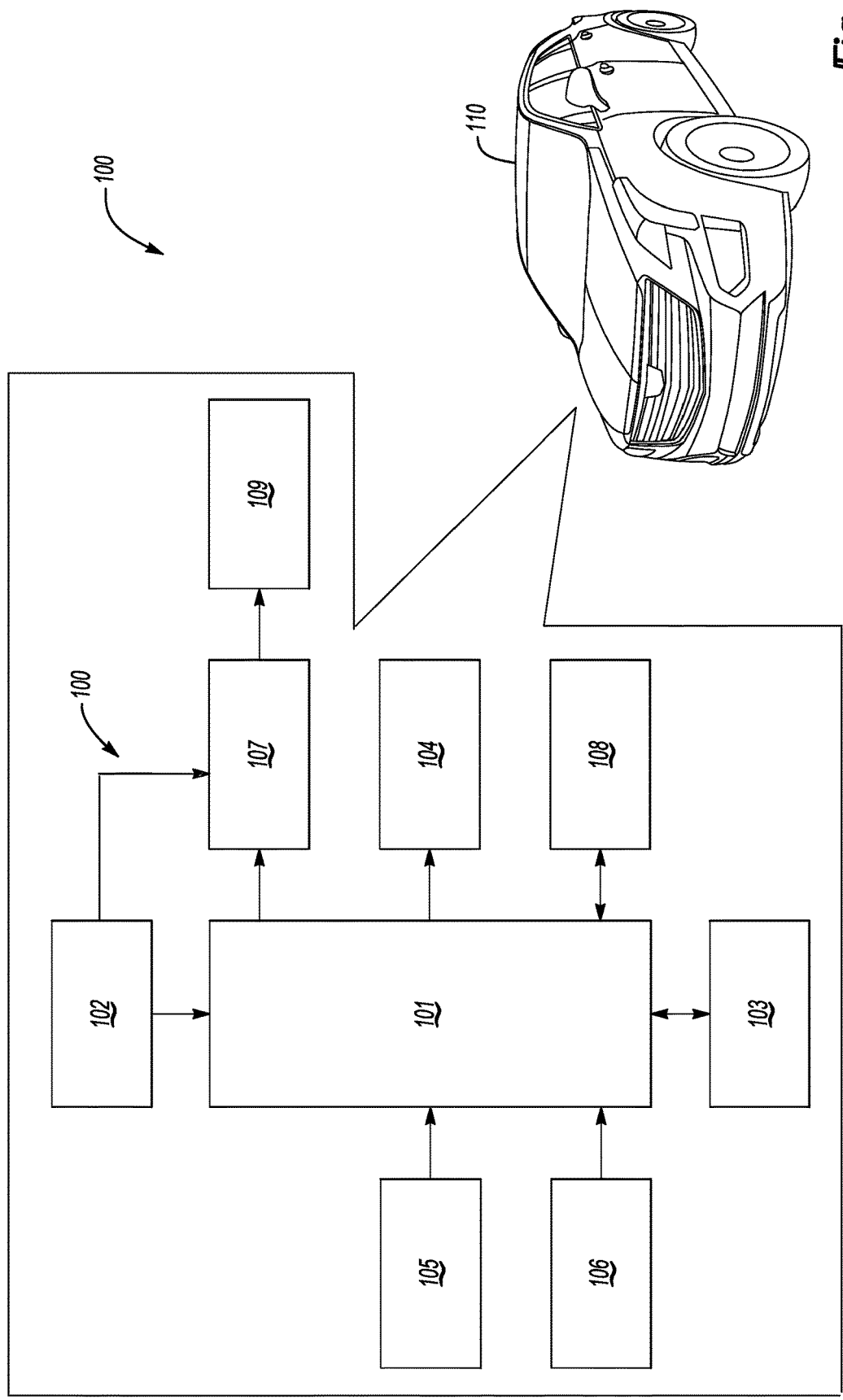
FIG. 1 shows a block diagram of an apparatus configured to reduce drag according to an exemplary embodiment.

An apparatus configured to reduce drag will now be described in detail with reference to FIGS. 1-4 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Fuel economy is one of the major issues in automobile design and engineering because of regulations and consumer demand for a more fuel-efficient vehicle. Fuel efficiency depends on elements such as engine design, body design, fuel, etc. Trade-offs between fuel economy, style, size, and utility are weighted and a particular design may be selected. The shape or design of the vehicle may affect the aerodynamic drag ("drag") of the vehicle which in turn affects fuel efficiency.

Drag can be reduced by delaying or eliminating the airflow separations on a vehicle surface or controlling the flow separation at the rear of a vehicle. Airflow controls may be implemented adding additional mechanical devices or electromechanical devices to the body of the vehicle to regulate or deflect airflow. One type of device that may be used to affect the airflow around a vehicle is a plasma actuator. However, plasma actuators have limitations that limit their effectiveness in a drag reduction application.

The present application addresses the limitations of plasma actuators with a plasma actuator design and configuration that generate air flow around a vehicle to reduce aerodynamic drag using a cylindrical plasma actuator design.

FIG. 1 shows a block diagram of an apparatus configured to reduce drag 100 according to an exemplary embodiment. As shown in FIG. 1, the apparatus configured to reduce drag 100, according to an exemplary embodiment, includes a controller 101, a power supply 102, a storage 103, an output 104, a sensor 105, a user input 106, a motion actuator 107, a communication device 108 and a plasma actuator 109. However, the apparatus configured to reduce drag 100 is not limited to the aforementioned configuration and may be configured to include additional elements and/or omit one or more of the aforementioned elements. The apparatus configured to reduce drag 100 may be implemented as part of a vehicle, as a standalone component, as a hybrid between an on vehicle and off vehicle device, or in another computing device.

The controller 101 controls the overall operation and function of the apparatus configured to reduce drag 100. The controller 101 may directly or indirectly control one or more of a power supply 102, a storage 103, an output 104, a sensor 105, a user input 106, a motion actuator 107, a communication device 108 and a plasma actuator 109, of the apparatus configured to reduce drag 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the power supply 102, the storage 103, the output 104, the sensor 105, the user input 106, the motion actuator 107, the communication device 108 and the plasma actuator 109 of the apparatus configured to reduce drag 100. The information may be sent and received via a bus or network, or may be directly read or written to/from one or more of the power supply 102, the storage 103, the output 104, the sensor 105, the user input 106, the motion actuator 107, the communication device 108 and the plasma actuator 109 of the apparatus configured to reduce drag 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the storage 103, the output 104, the sensor 105, the user input 106, the motion actuator 107, the communication device 108 and the plasma actuator 109, of the apparatus configured to reduce drag 100. The power supply 102 may include one or more from among a battery, an outlet, a capacitor, a solar energy cell, a generator, a wind energy device, an alternator, etc.

The storage 103 is configured for storing information and retrieving information used by the apparatus configured to reduce drag 100. The storage 103 may be controlled by the controller 101 to store and retrieve information received from one or more sensors 105 as well as computer or machine executable instructions to control the plasma actuator 109. The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The information may include information on air pressure provided by an air pressure sensor at one or more locations around a vehicle. The information may also include information vehicle speed provided by a vehicle speed sensor.

The output 104 outputs information in one or more forms including: visual, audible and/or haptic form. The output 104 may be controlled by the controller 101 to provide outputs to the user of the apparatus configured to reduce drag 100. The output 104 may include one or more from among a speaker, audio, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notification may include information notifying of the activation or deactivation of the plasma actuator 109 or the apparatus configured to reduce drag 109. The output 104 may also display images and information provided by one or more sensors 105.

The sensor 105 may include one or more from among a base pressure sensor, a rear driver side fender pressure sensor, a rear passenger side fender pressure sensor, a vehicle speed sensor, and any other sensor suitable for detecting aerodynamic drag around the apparatus configured to reduce drag 100. The sensor 105 may also include a vehicle speed sensor such as a speedometer, GPS device, etc.

The user input 106 is configured to provide information and commands to the apparatus configured to reduce drag 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to activate or deactivate the apparatus configured to reduce drag 100.

The motion actuator 107 may include a power controller and an actuator. The actuator may be a piezoelectric device such as a piezoelectric resonator. The actuator may include a flexible member configured attached to the actuator and attached to the plasma actuator 109.

The power controller may include circuitry including a signal generator such as a pulse generator (e.g., a solid-state pulse generator) and an amplifier. In addition, the power controller may include a direct current to direct current convertor and pulse generator such as a solid-state pulse generator. According to one example, the power controller may include transformer configured to convert AC power supplied by the power supply to an AC voltage and frequency to operate the plasma actuator. According to another example, the power controller may include a direct current (DC) to DC converter configured to convert the power supplied by the power supply to an appropriate voltage and frequency to operate the plasma actuator. According to yet another example, the power controller may be configured to convert 12V direct court power supplied by the power supply 102 to a 10 KV 500 HZ DC signal.

The power controller may be configured to adjust the frequency of an output signal in a range between 2 KHz and 20 KHz according to the speed of the vehicle and the base pressure. The power controller may also be configured to adjust the frequency of an output signal in a range between 2 KHz and 20 KHz according to the speed of the vehicle and the base pressure. Moreover, the power controller may be configured to output a voltage of up to 10 KV to the piezoelectric device.

The communication device 108 may be used by apparatus configured to reduce drag 100 to communicate with several types of external apparatuses according to various communication methods. The communication device 108 may be used to send/receive various information such as information on operation mode of the vehicle and control information for operating the apparatus configured to reduce drag 100 to/from the controller 101.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

The plasma actuator 109 is an electrical device that generates a wall bounded jet without the use of moving parts. In particular, plasma actuators 109 work by forming plasma between a pair of electrodes that causes the air molecules surrounding the electrodes to ionize and accelerate through the electric field, thereby causing a plasma jet. An exemplary embodiment of a plasma actuator of the apparatus configured to reduce drag 100 is described in detail with respect to FIG. 3.

Figure 2A:
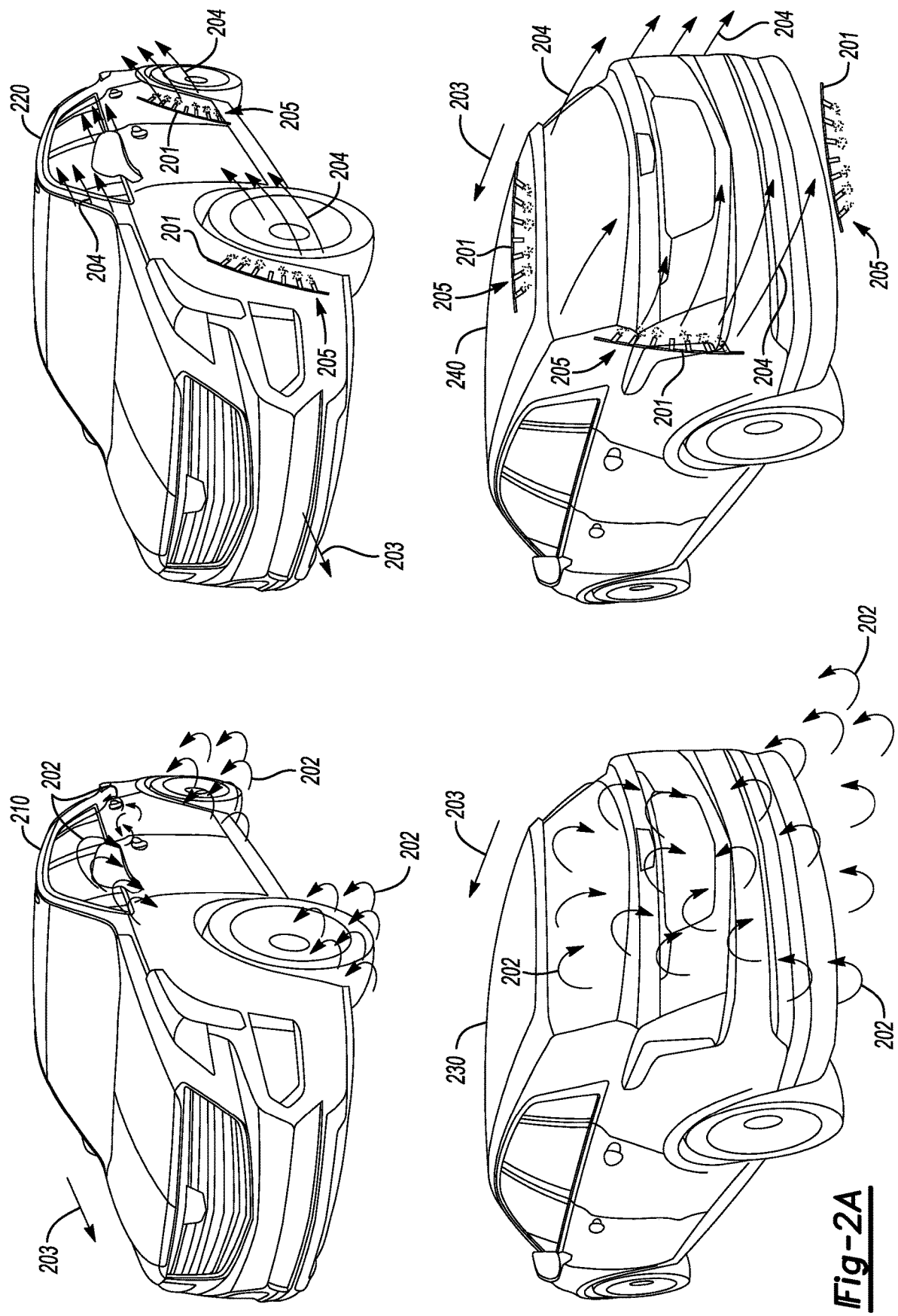

FIGS. 2A and 2B show illustrations of various configurations of plasma actuators controlled by an apparatus configured to reduce drag according several aspects of exemplary embodiments. Referring to FIG. 2, three example configuration of plasma actuators are shown. However, the exemplary embodiments are not limited to these examples and the apparatus configured to reduce drag 100 may be have one or more plasma actuators 201 at positioned to emit micro plasma jets 205 at any position on a vehicle in configuration to reduce aerodynamic drag of the vehicle.

In a first example, drag 202 is generated as vehicle 210 moves in a forward direction represented by arrow 203. The drag is generated around the wheel wells and side view mirrors of vehicle 210. In vehicle 220, the plasma actuators 201 of the apparatus configured to reduce drag 100 are placed in the front part of the wheel well, on the A-pillar, and side view mirror. Arrows 204 show the reduction of drag as the plasma actuators 201 emit jet flows 205.

In a second example, drag 202 is generated as vehicle 230 moves in a forward direction represented by arrow 203. The drag is generated around the rear perimeter of vehicle 230. In vehicle 240, the plasma actuators 201 of the apparatus configured to reduce drag 100 are placed on top of liftgate, under the rear bumper, on the rear passenger side edge, and on the rear driver side edge of vehicle 240. Arrows 204 show the reduction of drag as the plasma actuators 201 emit jet flows 205.

Referring to FIG. 2B, a side view of vehicle 250 shows placement of the plasma 201 actuators of the apparatus configured to reduce drag 100. In particular, the plasma actuators 201 are placed on top of liftgate, under the rear bumper, under the front bumper, and in between the front and rear wheels. The reduction of drag is achieved as the plasma actuators 201 emit jet flows 205.

FIG. 3 shows a plasma actuator 300 of the apparatus configured to reduce drag 100 according to aspects of an exemplary embodiment. Referring to FIG. 3, a plasma actuator 300 and a plurality of plasma actuators 300 disposed along a surface 306 are shown.

The plasma actuator 300 may include an exposed exterior electrode 301 is disposed along an external circumferential axis of cylinder 302. An interior electrode 304 is disposed an internal circumferential axis of cylinder 303 upstream from exposed electrode 301. In addition, a plasma layer 303 disposed an internal circumferential axis of cylinder 303 between exposed exterior electrode 301 and interior electrode 304. The plasma layer 303 may be adjacent to the interior electrode 304. The induced airflow 305 or plasma jet between the through cylinder 302 is affected the input voltage and the input frequency applied to one or more of the electrodes. The cylinder 302 may comprise an insulator. For example, the cylinder 302 may be made of ceramics.

A plurality of plasma actuators 300 disposed along a surface 306 are shown. A motion actuator may be configured to cause the surface 306 or the plasma actuators 300 to move. The motion actuator may cause the plasma actuators 300 to move in a sweeping motion while emitting plasma jet flow.

Figure 4:
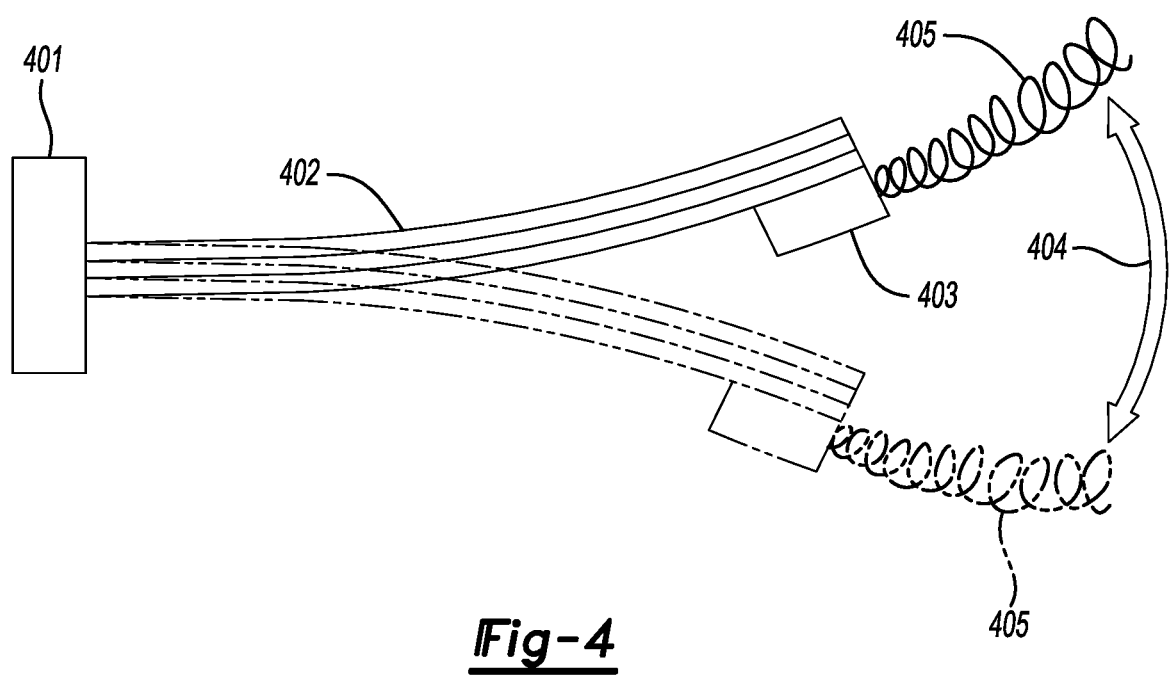
FIG. 4 shows an illustration of a sweeping motion of the plasma actuator controlled by the apparatus configured to reduce drag according to an aspect of an exemplary embodiment.

FIG. 4 shows an illustration of sweeping motion of the plasma actuator controlled by the apparatus configured to reduce drag according to an aspect of an exemplary embodiment. Referring to FIG. 4, a plasma actuator 403 is performing a sweeping motion 404 while micro plasma jets 405 are emitted by the plasma actuator 403.

The plasma actuator 403 is attached to a piezoelectric device 401 by a long flexible body 402. The piezoelectric device 401 is triggered and actuates at a frequency causing the flexible body 402 to bend or flex thereby sweeping the plasma actuator 403 in an up-down or left-right motion with respect to a surface onto which the plasma actuator 403 is attached.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. An apparatus configured to reduce drag, the apparatus comprising:
   a plasma actuator comprising a hollow cylinder with two open bases, a first electrode disposed inside the cylinder, a second electrode disposed outside the cylinder, and a plasma layer inside the cylinder next to the first electrode;
   a surface comprising at least one of the plasma actuator disposed on the surface; and
   a motion actuator configured to cause the at least one of the plasma actuator to move in a sweeping motion across the surface.

2. The apparatus of claim 1, wherein the surface comprises one or more from among a top of a side view mirror of a vehicle, A pillar of a vehicle, a bottom of an area under a front bumper of a vehicle, a bottom of an area between front and back wheels of a vehicle, wheel wells of a vehicle, a top of a trunk, a liftgate, a tailgate or a hatch of a vehicle, a bottom of an area under a rear bumper of a vehicle, and a vertical edge at a driver side or passenger side of a rear of a vehicle.

3. The apparatus of claim 1, wherein the at least one of the plasma actuator comprises a plurality of plasma actuators.

4. The apparatus of claim 1, wherein the motion actuator is configured to move the surface to cause the at least of the plasma actuator to sweep across the surface.

5. The apparatus of claim 1, wherein the motion actuator is configured to move the plasma actuator to sweep across the surface.

6. The apparatus of claim 1, wherein the motion actuator comprises a piezoelectric device.

7. The apparatus of claim 6, further comprising a vehicle speed sensor configured to measure a speed of a vehicle,
   wherein the motion actuator comprises a power controller configured to adjust a frequency and a voltage of power supplied to the piezoelectric device according to the speed of the vehicle measured by the speed sensor.

8. The apparatus of claim 7, further comprising a base pressure sensor configured to detect a base pressure of an area behind a vehicle,
   wherein the power controller is configured to adjust the frequency and the voltage of power supplied to the piezoelectric device according to the speed of the vehicle and the base pressure measured by the base pressure sensor.

9. The apparatus of claim 8, wherein the power controller is configured to adjust the frequency in range between 2 KHz and 20 KHz according to the speed of the vehicle and the base pressure.

10. The apparatus of claim 6, further comprising a base pressure sensor configured to detect a base pressure of an area behind a vehicle,
    wherein the power controller is configured to adjust a frequency and voltage of power supplied to the piezoelectric device according to the base pressure measured by the base pressure sensor.

11. The apparatus of claim 10, wherein the power controller is configured to adjust the frequency in range between 2 KHz and 20 KHz according to the speed of the vehicle and the base pressure.

12. The apparatus of claim 11, wherein the power controller is configured to output a voltage of up to 10 KV to the piezoelectric device.

13. The apparatus of claim 6, wherein the motion actuator comprises a direct current (DC) to DC converter configured to covert power to an appropriate voltage and frequency to operate the piezoelectric device.

14. The apparatus of claim 13, wherein the direct current (DC) to DC converter includes a signal generator and an amplifier.

15. The apparatus of claim 14, wherein the piezoelectric device comprises a piezoelectric resonator configured to receive a signal processed by the signal generator and the amplifier.

16. The apparatus of claim 1, wherein the surface comprises a curved surface.

17. The apparatus of claim 1, wherein the hollow cylinder comprises an insulator.

18. An apparatus configured to reduce drag, the apparatus comprising:
 a plasma actuator;
 a surface comprising at least one of the plasma actuator disposed on the surface; and
 a motion actuator configured to cause the at least one of the plasma actuator to move in a sweeping motion across the surface.

19. The apparatus of claim 18, wherein the motion actuator comprises a piezoelectric device, the apparatus further comprising a vehicle speed sensor configured to measure a speed of a vehicle,
 wherein the motion actuator comprises a power controller configured to adjust a frequency and a voltage of power supplied to the piezoelectric device according to the speed of the vehicle measured by the speed sensor.

20. The apparatus of claim 19, further comprising a base pressure sensor configured to detect a base pressure of an area behind a vehicle,
 wherein the power controller is configured to adjust the frequency and the voltage of power supplied to the piezoelectric device according to the speed of the vehicle and the base pressure measured by the base pressure sensor.

* * * * *